United States Patent
Soma

(10) Patent No.: US 7,336,637 B2
(45) Date of Patent: Feb. 26, 2008

(54) CDMA COMMUNICATION DEVICE FOR IMPROVING THE USABILITY OF FREQUENCIES AND SUPPRESSING THE OCCURRENCE OF CALL LOSS

(75) Inventor: Shintaro Soma, Tokyo (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 537 days.

(21) Appl. No.: 10/898,310

(22) Filed: Jul. 26, 2004

(65) Prior Publication Data
US 2005/0025111 A1 Feb. 3, 2005

(30) Foreign Application Priority Data
Aug. 1, 2003 (JP) .............................. 2003-285162

(51) Int. Cl.
*H04B 1/16* (2006.01)
(52) U.S. Cl. ...................... 370/335; 370/335; 370/342; 370/210; 370/343; 370/350; 370/320; 370/332; 370/510; 375/260; 375/140; 375/130
(58) Field of Classification Search ................ 375/141, 375/142, 146, 260, 267, 296, 295; 370/335, 370/342, 441
See application file for complete search history.

(56) References Cited

U.S. PATENT DOCUMENTS

| 6,839,335 | B1 * | 1/2005 | Sudo ........................... 370/335 |
| 6,999,467 | B2 * | 2/2006 | Krauss et al. ................ 370/441 |
| 7,126,931 | B2 * | 10/2006 | Take ........................... 370/335 |
| 2002/0159425 | A1 * | 10/2002 | Uesugi et al. .............. 370/342 |
| 2002/0196756 | A1 | 12/2002 | Hasegawa |
| 2003/0185179 | A1 * | 10/2003 | Inogai et al. ............... 370/335 |
| 2003/0214927 | A1 * | 11/2003 | Atarashi et al. ............ 370/335 |
| 2005/0025113 | A1 * | 2/2005 | Lestable ..................... 370/343 |
| 2005/0185725 | A1 * | 8/2005 | Maeda et al. ............... 375/260 |
| 2007/0104086 | A1 * | 5/2007 | Bang et al. ................. 370/206 |

FOREIGN PATENT DOCUMENTS

| JP | 11-234242 | 8/1999 |
| JP | 2000-341173 | 12/2000 |
| JP | 2001-16135 | 1/2001 |
| JP | 2001-156683 | 6/2001 |
| JP | 2002-135229 | 5/2002 |
| JP | 2003-8546 | 1/2003 |
| JP | 2003-46474 | 2/2003 |

* cited by examiner

*Primary Examiner*—Joseph Feild
*Assistant Examiner*—Randy Peaches
(74) *Attorney, Agent, or Firm*—Foley & Lardner LLP

(57) ABSTRACT

The CDMA communication device of the present invention includes a spreading unit, radio transmitters, and a control device that includes a setting unit and a determination unit. The spreading unit spreads and multiplexes user data of users. The radio transmitters are provided correspondingly to each of a plurality of frequencies, and modulate with the corresponding frequencies the user data that are supplied from the spreading unit. The determination unit determines the working frequency of users based on the spread factor value of the user data. The setting unit sets the spread factor of the user data in the spreading unit. The setting unit further performs setting of the spreading unit such that user data that have undergone spreading are supplied to the radio transmitter that has been provided correspondingly to the frequency determined by the determination unit.

8 Claims, 6 Drawing Sheets

CDMA COMMUNICATION DEVICE FOR IMPROVING THE USABILITY OF FREQUENCIES AND SUPPRESSING THE OCCURRENCE OF CALL LOSS

BACKGROUND OF THE INVENTION

1. Field of the Invention

The present invention relates to a CDMA communication device and CDMA communication method.

2. Description of the Related Art

In CDMA (Code Division Multiple Access), which employs spread spectrum technology in radio transmission, the channel symbol rate and the spread factor (hereinbelow, referred to as "SF value") are inversely proportional to each other in an environment in which chip rates are identical.

In a CDMA base station, changing the size of the SF value enables both changes to various transfer rates as well as the multiplexing and transmission of the user data of a plurality of users.

The maximum number of users for which user data can be multiplexed in a CDMA base station is determined by the Signal-to-Interference Rate (hereinbelow, referred to as "SIR value") of the user data when the user data that are transmitted from the CDMA base station are despread and decoded at users' mobile devices.

Thus, in a CDMA base station, multiplexing user data to the minimum extent of SIR value that can still guarantee the quality of various communication services allows the communication services to be offered to more users.

The composition of the transmission components of a CDMA base station of the prior art is shown in FIG. 1.

Referring now to FIG. 1, a CDMA base station of this example of the prior art includes: spreading unit 100 for spreading and multiplexing user data #1-#n, control device 600 for controlling spreading unit 100, radio transmitters $300_1$-$300_m$ that are provided correspondingly to each of m frequencies f1-fm for modulating the user data that have undergone spreading at the corresponding frequency, combiner 400 for combining user data that have undergone modulation, and antenna 500 for the radio transmission of user data that have undergone combining. Antenna 500 can share the m frequencies f1-fm.

Spreading unit 100 includes: spreader 110, adder selector circuit 120, and multiple-input adders $130_1$-$130_m$ that are provided correspondingly to each of m frequencies f1-fm.

Spreader 110 receives user data #1-#n as input and spreads the received user data #1-#n. Spreader 110 is connected to control device 600, and the SF value when spreading user data #1-#n is set by means of control device 600.

Adder selector circuit 120 is connected to control device 600 and distributes user data, which have undergone spreading, to multiple-input adders $130_1$-$130_m$ each corresponding to one of the frequencies that have been set by control device 600. Control device 600 controls the assignment of each user's frequency to one of frequencies f1-fm, i.e., controls the assignment and transmission of user data #1-#n for each user to any of radio transmitters $300_1$-$300_m$ at frequencies f1-fm. As the control method, the working frequency may be determined by, for example, round-robin scheduling. Technology for assigning a carrier (frequency) to each user in this way is disclosed in, for example, Japanese Patent Laid-Open Publication No. 2003-046474.

Multiple-input adders $130_1$-$130_m$ are each connected to respective radio transmitters $300_1$-$300_m$, multiplex user data that have undergone spreading, and supply the multiplexed user data to the radio transmitters $130_1$-$130_m$ to which the respective multiple-input adder are connected.

The operation of the CDMA base station in this example of the prior art is next explained.

Spreader 110 first spreads user data #1 -#n by the SF value that has been set by means of control device 600 and supplies the result to adder selector circuit 120.

Adder selector circuit 120 next selects one of multiple-input adders $130_1$-$130_m$ each corresponding to the respective frequencies that have been set by means of control device 600, and supplies the user data that have undergone spreading and that have been supplied as input from spreader 110 to the selected one of multiple-input adders $130_1$-$130_m$.

Each of multiple-input adders $130_1$-$130_m$ next multiplexes the user data that have undergone spreading and that have been supplied as input from adder selector circuit 120, and then supplies the user data that have undergone multiplexing to one of radio transmitters $300_1$-$300_m$ to which the multiple-input adder is connected.

Radio transmitters $300_1$-$300_m$ modulate the user data, which have undergone multiplexing and have been supplied as input from multiple-input adders $130_1$-$130_m$, with respective frequencies f1-fm.

The user data that have undergone modulation by radio transmitters $300_1$-$300_m$ are next combined by combiner 400 and radio-transmitted from antenna 500.

As described in the foregoing explanation, when assigning the user data of each user to a radio transmitter in the CDMA base station of the prior art that is shown in FIG. 1, the assignment is realized in accordance with round-robin scheduling without consideration of the SF value.

If the user data of a new user are assigned to a radio transmitter that already holds the user data of other users, user data having a large SF value can be accommodated in the radio transmitter. However, if the user data has a small SF value, the possibility arises that an SIR value that can guarantee communication service will not be secured and these user data will not be accommodated in the radio transmitter. The occurrence of this problem results in both the occurrence of call loss and a deterioration of the usability of the frequencies.

The number of radio transmitters can be increased as a means of dealing with this problem, but this is not a true solution because, if attention is placed on any particular radio transmitter, the possibility remains that the same problem will occur. In addition, there is the additional problem that increasing the number of radio transmitters results in an increase in the circuit scale.

SUMMARY OF THE INVENTION

It is an object of the present invention to provide a CDMA communication device and CDMA communication method that can both suppress the occurrence of call loss and improve the usability of frequencies.

In the CDMA communication device according to the present invention for achieving the above-described object, the control means is provided with a determination means for determining the working frequency that is assigned to a user based on the spread factor of user data. More specifically, this determination means calculates a coefficient based on the spread factor of the user data. The determination means further calculates, for all of the frequencies, the total values of the coefficients of the user data to which the frequencies have been assigned and compares, among the plurality of frequencies, the calculated total values of the coefficients. Based on the results of this comparison, the determination means then assigns to the user the radio transmission means having the frequency for which the total value of coefficients is lowest, i.e., the radio transmission means among the plurality of radio transmission means that, in terms of the number of accommodated users, has the most capacity to spare.

This assignment of the working frequency to users based on the spread factor of user data can prevent the sudden accommodation of user data having a small spread factor in a radio transmission means that already accommodates user data having a large spread factor. In addition, the total value of the coefficients of user data is a value that takes into consideration both the number of users and service (spread factor) and thus can avoid a situation in which some radio transmission means do not accommodate any user data at all.

Accordingly, the occurrence of call loss can be suppressed and frequencies can be used efficiently without waste.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 1:
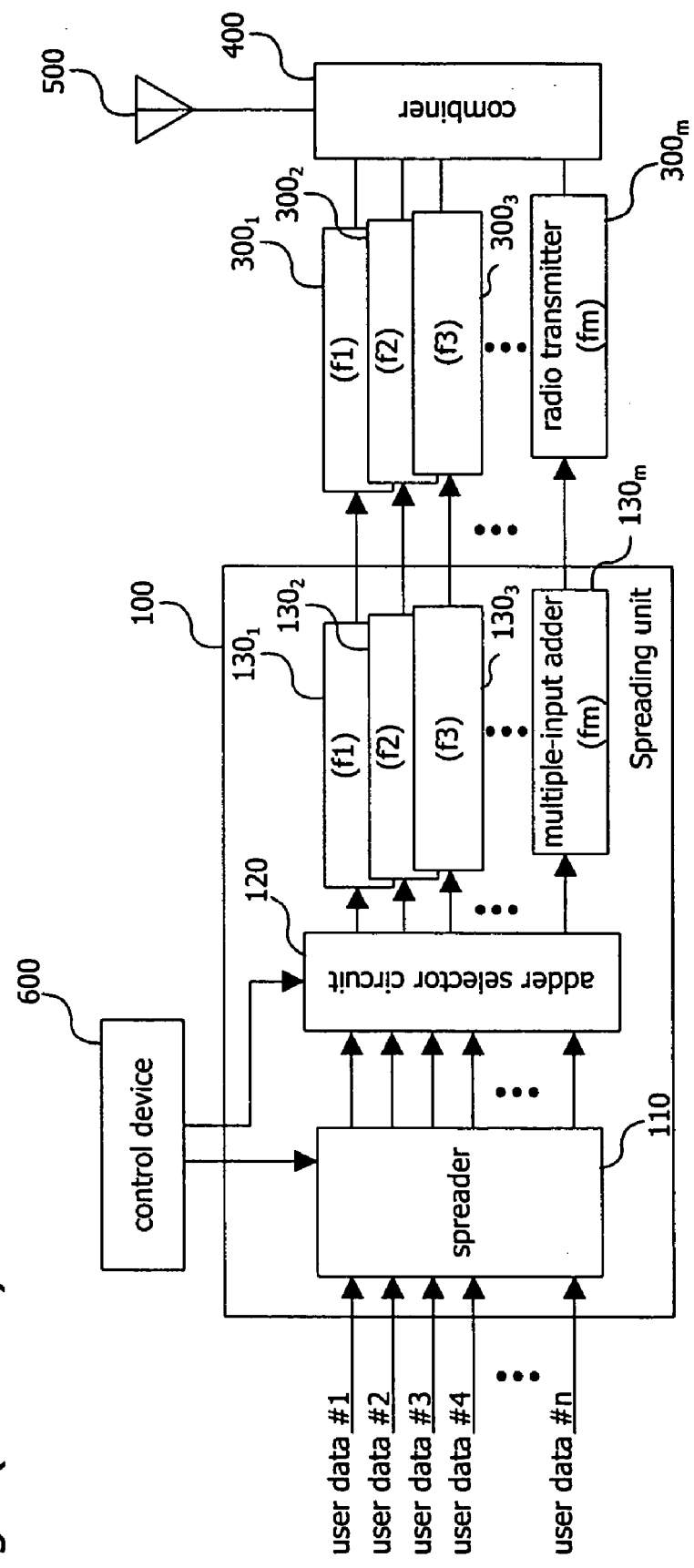
FIG. 1 shows the configuration of a CDMA communication device of the prior art.
Figure 2:
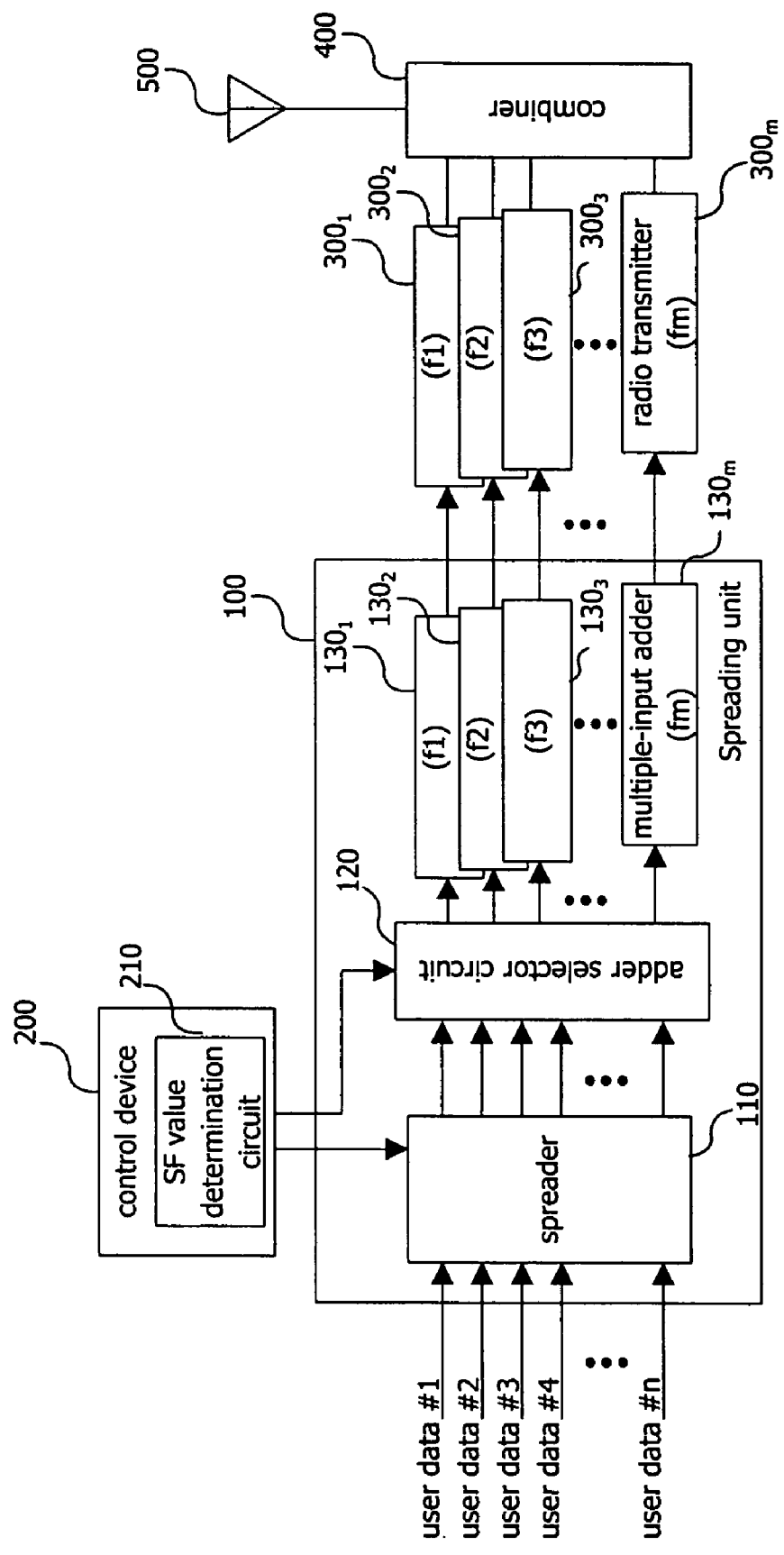
FIG. 2 shows the configuration of a CDMA communication device according to the first embodiment of the present invention.

FIG. 2 shows the configuration of the transmission unit of a CDMA base station that is applied as the CDMA communication device according to the first embodiment of the present invention. Regarding portions of FIG. 2 that are equivalent to portions of FIG. 1, the same reference numerals have been applied and detailed explanation is here omitted.

Referring now to FIG. 2, the CDMA base station according to the present embodiment differs from the configuration of the prior art that is shown in FIG. 1 in that SF value determination circuit 210 has been added in control device 200. Otherwise, spreading unit 100 as the spreading means, radio transmitters $300_1$-$300_m$, combiner 400, and antenna 500 are equivalent to the prior-art configuration that is shown in FIG. 1.

Figure 3:
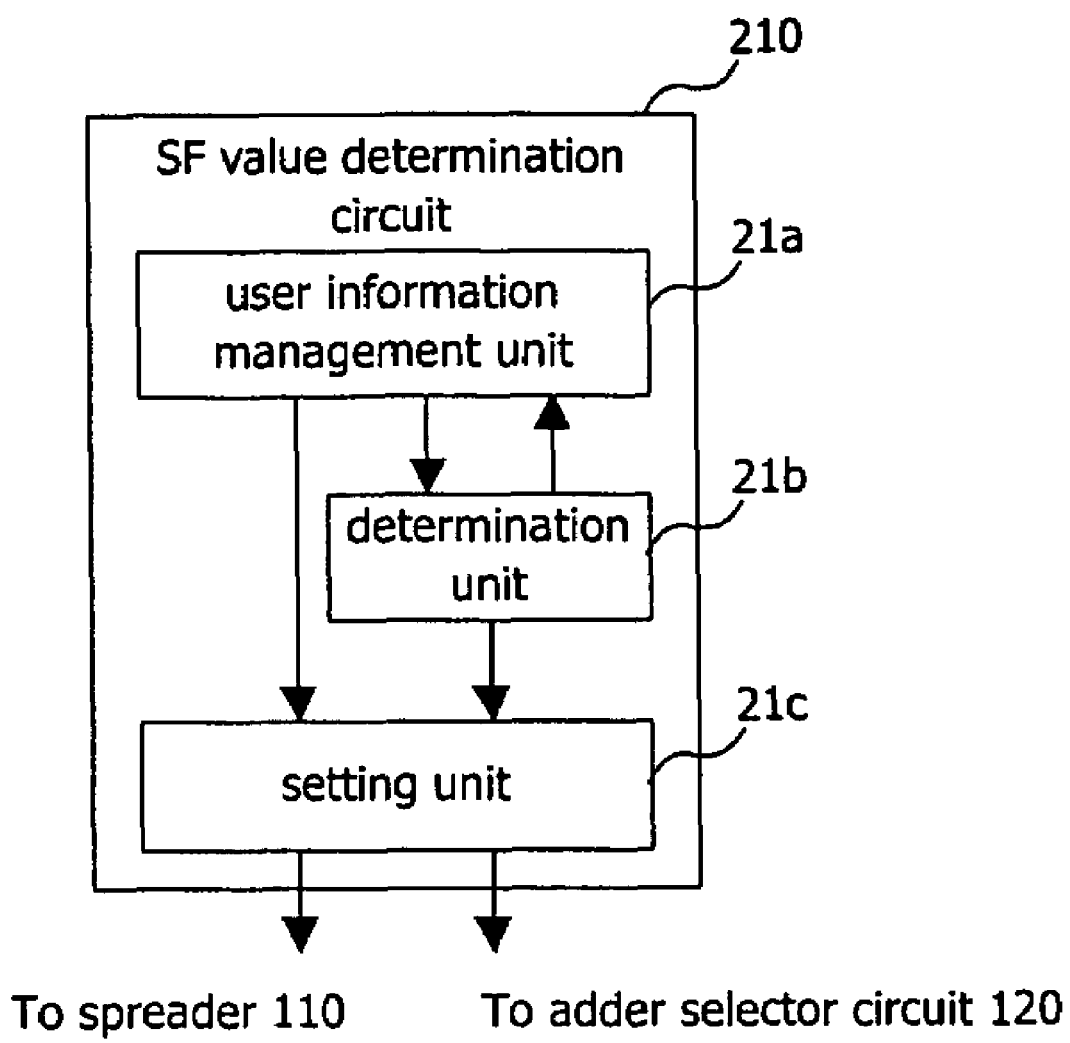
FIG. 3 shows the configuration of the SF value determination circuit that is shown in FIG. 2.

Referring to FIG. 3, SF value determination circuit 210, which is the distinguishing feature of the present invention, includes: user information management unit 21a, determination unit 21b, and setting unit 21c.

User information management unit 21a manages the user numbers, the SF value of the user data of these users, and the working frequencies that are assigned to these users as user information. User information management unit 21a is connected to determination unit 21b and setting unit 21c and reports the user number and SF value to determination unit 21b and setting unit 21c. User information management unit 21a also receives information on the working frequency of a new user that has been determined by determination unit 21b and updates the user information based on the received information.

Determination unit 21b determines the working frequency of a new user based on the SF value that is reported from user information management unit 21a and reports the working frequency that has been determined together with the user number of the new user to user information management unit 21a and setting unit 21c.

Setting unit 21c is connected to adder selector circuit 120 and spreader 110 shown in FIG. 2, and sets the user number and SF value that have been reported from user information management unit 21a in spreader 110, and sets the working frequency and user number that have been reported from determination unit 21b in adder selector circuit 120. Spreader 110 and adder selector circuit 120 perform processing based on the set values that have been set by setting unit 21c.

The following explanation relates to the operation of SF value determination circuit 210 in the present embodiment.

Figure 4:
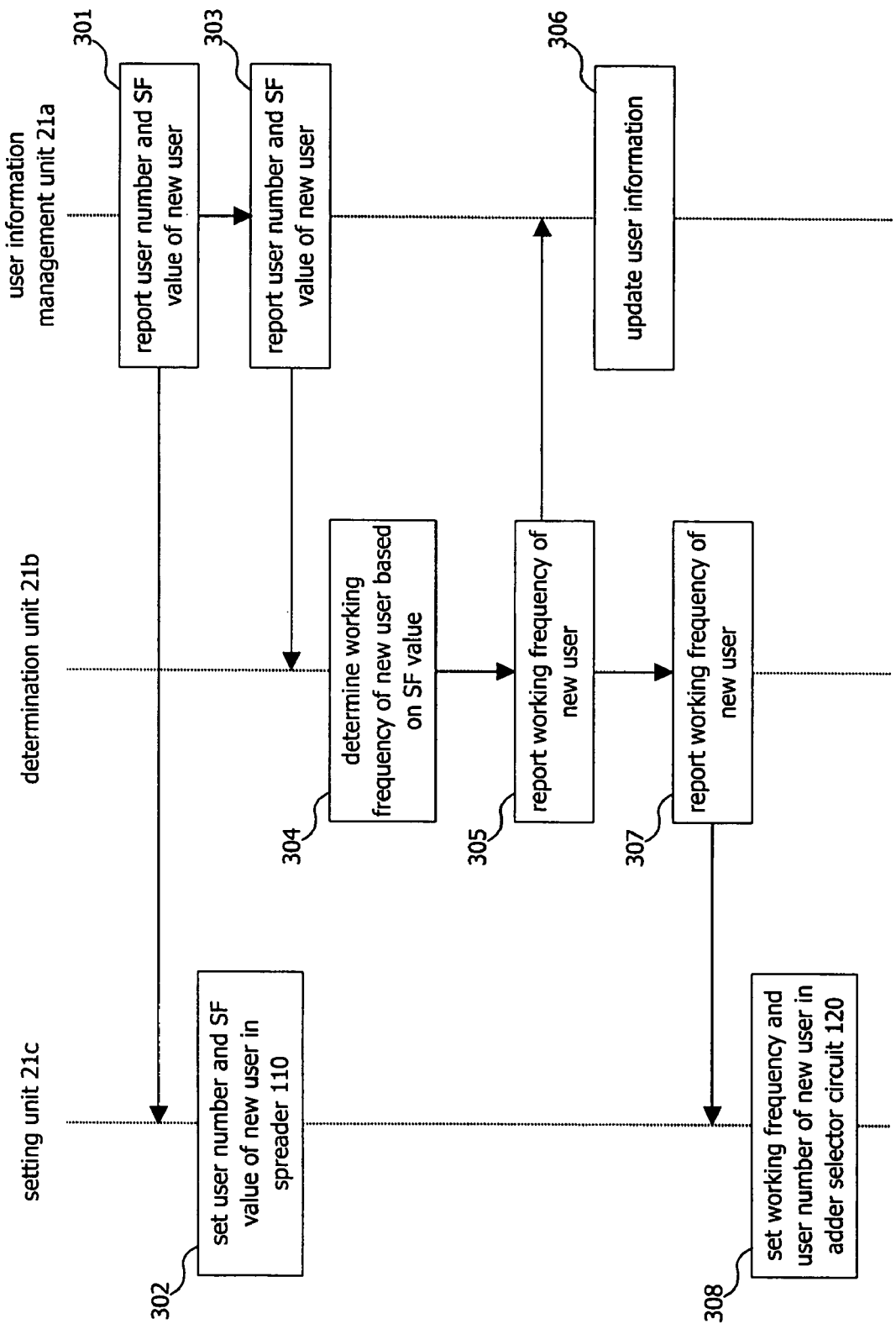
FIG. 4 is a flow chart for explaining the succession of processes of each of the constituent elements in the SF value determination circuit that is shown in FIG. 3.

Referring to FIG. 4, user information management unit 21a first reports the user number of a new user and the SF value of the user data of that user to setting unit 21c in Step 301. Setting unit 21c sets the SF value and user number that have been reported from user information management unit 21a in spreader 110 in Step 302.

User information management unit 21a next reports the user number and the SF value of the user data of that user to determination unit 21b in Step 303.

In Step 304, determination unit 21b determines the working frequency of the new user based on the SF value that has been reported from user information management unit 21a.

Determination unit 21b next reports the working frequency of the new user that has been determined as described above to user information management unit 21a in Step 305, and in Step 306, user information management unit 21a updates the user information based on the information that has been reported from determination unit 21b.

Next, in Step 307, determination unit 21b reports the working frequency of the new user that has been determined as described above together with the user number to setting unit 21c. Setting unit 21c sets the working frequency and user number of the new user that have been reported from determination unit 21b in adder selector circuit 120 in Step 308.

Figure 5:
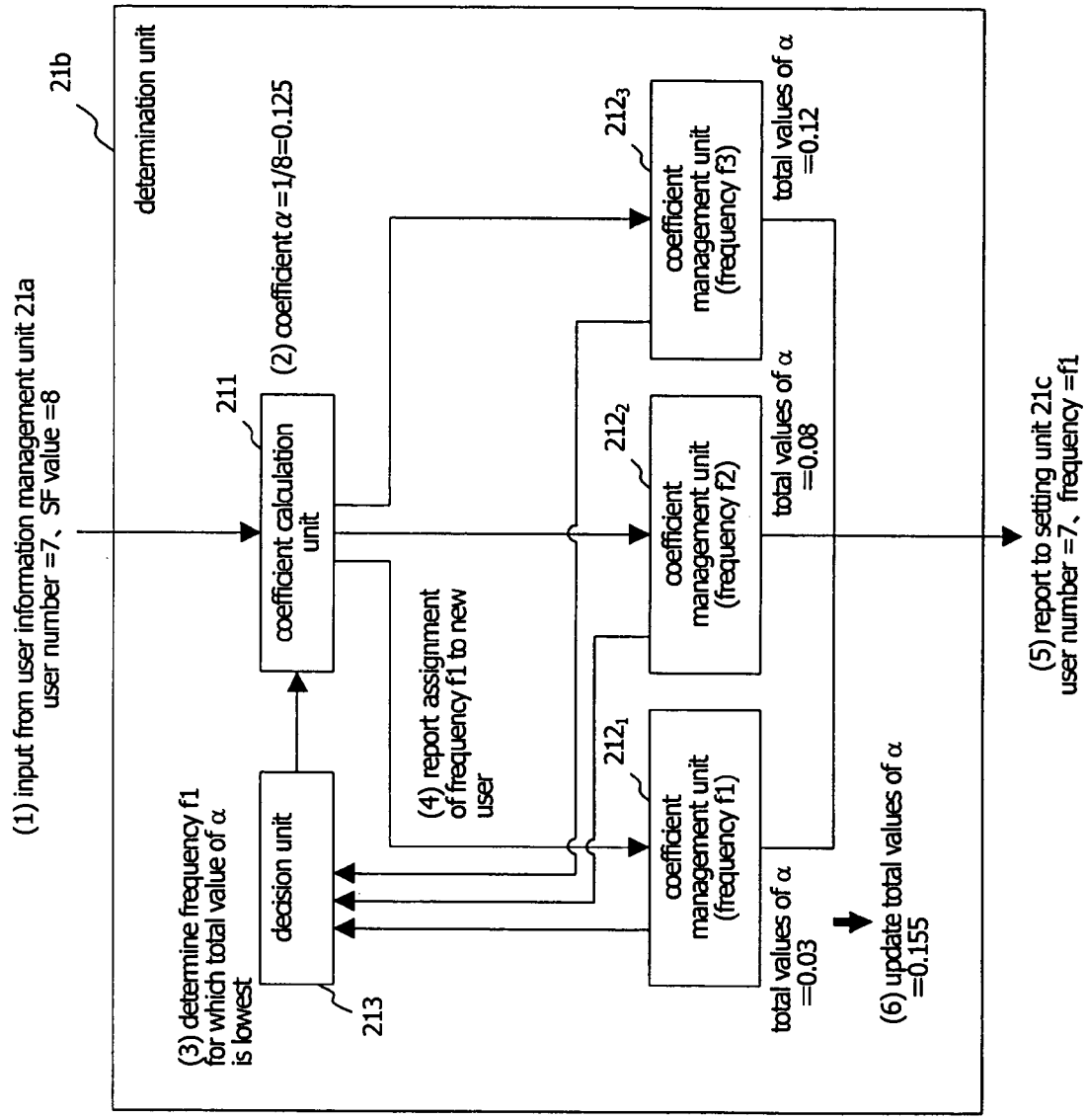
FIG. 5 is a view for explaining the configuration and operation of the determination unit that is shown in FIG. 3.

The following explanation regards the details of the configuration and operation of determination unit 21b with reference to FIG. 5. Although the number of multiple-input adders $130_1$-$130_m$ in FIG. 2 was m, a specific example is shown in FIG. 5 for a case in which the number of multiple-input adders is just three (antenna 500 being able to share up to three frequencies).

Referring to FIG. 5, determination unit 21b includes: coefficient calculation unit 211, coefficient management units $212_1$-$212_3$ that are provided correspondingly to each of frequencies f1-f3, and decision unit 213.

Each of the constituent elements in determination unit 21b performs the following operations when determining the working frequency of a new user.

(1) The user number of a new user and the SF value of the user data of that user are applied as input to coefficient calculation unit 211 from user information management unit 21a. In the present example, the user number is 7 and the SF value is 8.

(2) Coefficient calculation unit 211 thereupon calculates the coefficient a based on the SF value that has been supplied as input from user information management unit 21a. In the present example, the reciprocal of SF value 8 is taken and coefficient α is therefore calculated as 0.125. In addition, the total value of coefficients α of the user data of users already accommodated in radio transmitters $300_1$-$300_3$ is managed by coefficient management units $212_1$-$212_3$ for frequencies f1-f3, respectively. In the present embodiment, the total values of coefficient α are 0.03 for frequency f1, 0.08 for frequency f2, and 0.12 for frequency f3. These total values are values that take into consideration both the number of users and the SF values of the user data of these users.

(3) Decision unit 213 compares the total values of coefficients α for frequencies f1-f3 that are managed by coefficient management units $212_1$-$212_3$, respectively, against frequencies f1-f3 and determines the working frequency that is to be assigned to a new user based on the results of this comparison.

More specifically, decision unit 213 determines the frequency for which the total value of coefficient α is lowest as the working frequency of a new user. The frequency that is determined in this case is the frequency of the radio transmitter among radio transmitters $300_1$-$300_3$ having the most capacity (having vacancy) in the volume of accommodated user data, the frequency that is determined in this case being frequency f1.

(4) Coefficient calculation unit 211 reports the assignment of the working frequency to the new user and the user number of this user to, of coefficient management units $212_1$-$212_3$, the coefficient management unit of the frequency that decision unit 213 has determined as the working frequency of the new user. In this example, coefficient calculation unit 211 reports, to coefficient management unit $212_1$ of frequency f1, user number 7 of the new user and the assignment of frequency f1 to this user.

(5) Of coefficient management units $212_1$-$212_3$, the coefficient management unit of the frequency to which the new user has been added reports the user number of the new user and the working frequency to setting unit 21c. In the present example, coefficient management unit $212_1$ of frequency f1 reports user number 7 of the new user and the working frequency f1 to setting unit 21c.

(6) Of coefficient management units $212_1$-$212_3$, the coefficient management unit of the frequency to which the new user has been added updates the total value of coefficients α by adding coefficient α of the new user that has been added to the original total value. In the present example, coefficient management unit $212_1$ of frequency f1 updates the total value of coefficient α of frequency f1 to 0.03+ 0.125=0.155. The total value of coefficient α of frequency f2 thereby becomes the lowest, and as a result, when assigning the working frequency to the next new user, decision unit 213 will determine the working frequency of the new user to be frequency f2.

Second Embodiment

Figure 6:
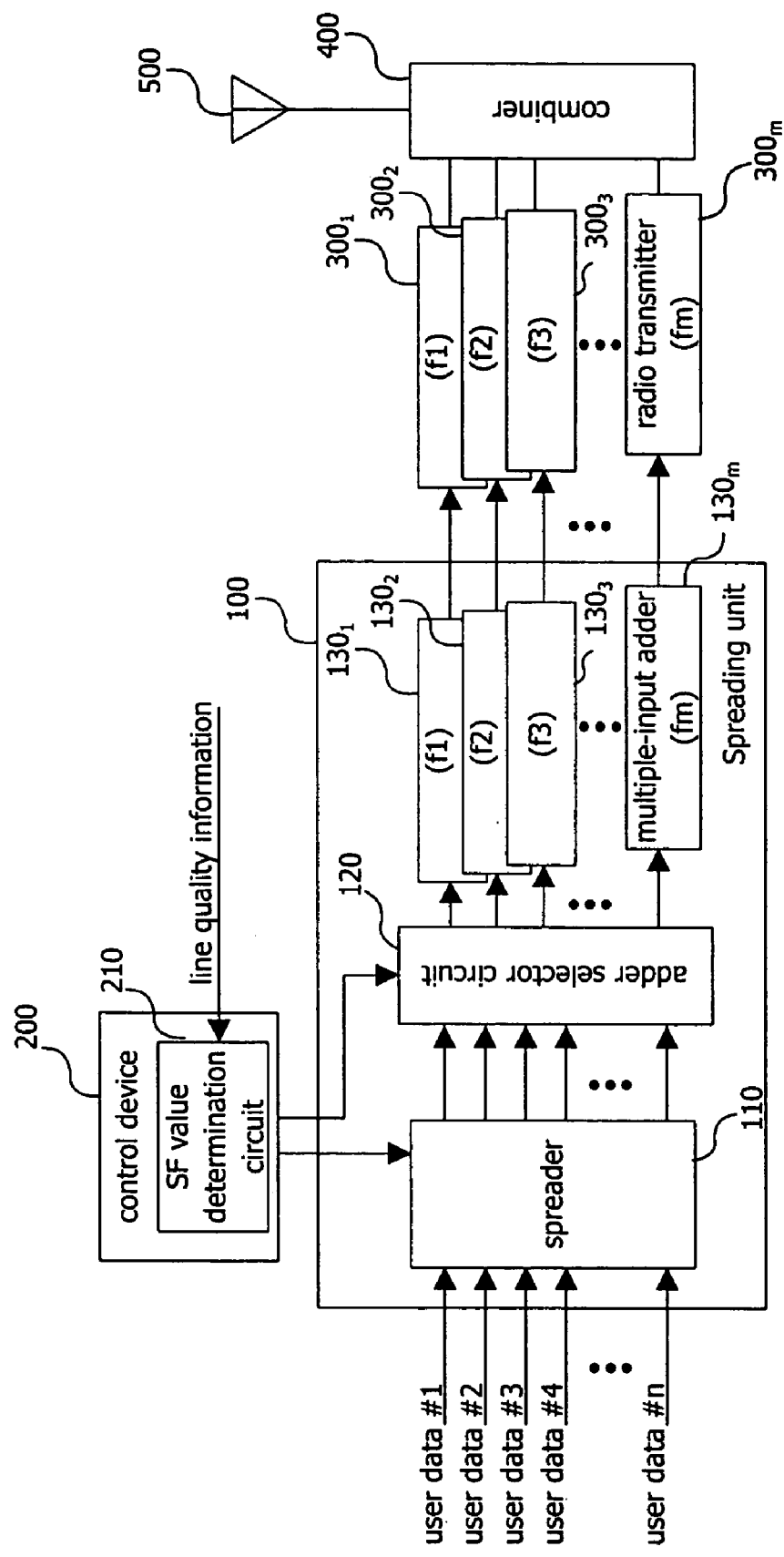
FIG. 6 shows the configuration of the CDMA communication device according to the second embodiment of the present invention.

FIG. 6 shows the configuration of the transmission portion of CDMA base station that is applied as the CDMA communication device according to the second embodiment of the present invention. In FIG. 6, portions that are equivalent to FIG. 2 are given the same reference numbers and detailed explanation is here omitted.

Referring to FIG. 6, the CDMA base station according to the present embodiment differs from the configuration that is shown in FIG. 2 in that line quality information of a downlink line is applied as input from a radio receiver (not shown in the figure) to SF value determination circuit 210A in control device 200A. Line quality information is line quality information of the downlink lines from this CDMA base station to the mobile device of each user. In this radio receiver, line quality information of the respective downlink lines is received from the mobile device of each user, and the line quality information that is received is applied as input to SF value determination circuit 210A.

Line quality information is managed as user information by user information management unit 21a in SF value determination circuit 210A. Line quality information is, for example, the SIR value of user data that are transmitted from this CDMA base station to the mobile device of each user.

When the line quality information is, for example, an SIR value, each of the constituent elements within determination unit 21b (see FIG. 5) performs the following operations when determining the working frequency of a new user.

(1) The user number of a new user and the SF value of the user data of that user are supplied as input to coefficient calculation unit 211 from user information management unit 21a. The SIR values of the user data of users that have already been accommodated in each of radio transmitters $300_1$-$300_3$ at frequencies f1-f3 are applied as input to decision unit 213 from user information management unit 21a.

(2) Coefficient calculation unit 211 then calculates coefficients based on the SF values that have been received as input from user information management unit 21a.

(3) Decision unit 213 compares the total values of coefficients for frequencies f1-f3 with those of the other frequencies f1-f3 that are managed by coefficient management units $212_1$-$212_3$, respectively. Decision unit 213 further compares the SIR values of the user data of users, to which these frequencies have already been assigned, for frequencies f1-f3. For example, an SIR value of user data that are accommodated in a particular radio transmitter that is sufficiently lower than a target SIR value indicates: that the SIR value is high enough to guarantee the quality of the communication service in this radio transmitter, and further, that a large amount of user data can be accommodated. The target SIR value represents the minimum SIR value that can guarantee the quality of communication service. Decision unit 213 may compare for frequencies f1-f3 all user data of all users to which these frequencies have been assigned. In addition, decision unit 213 may extract any one or more items of user data from among all of the user data and then compare only the extracted user data.

Based on the results of comparison of the total values of coefficients that have been compared for frequencies f1-f3 and the results of comparison of the SIR values that have been compared for frequencies f1-f3, decision unit 213 determines the working frequency that is to be assigned to the new user.

More specifically, decision unit 213 determines, as the working frequency of a new user, the frequency for which the total value of coefficients is lowest, and moreover, the frequency for which the SIR value is lowest. When such a frequency is unavailable (such as when the total value of coefficients for a particular frequency is lowest, but the SIR value for that frequency is not the lowest), decision unit 213 determines the working frequency by prioritizing either the total value of coefficients or the SIR value. For example, when decision unit 213 determines the working frequency by prioritizing the SIR value, frequencies can be distributed so as to enable use of radio transmitters up to the limit of the SIR value that can guarantee the quality of the communication service, whereby the usability of frequencies can be further improved.

(4) Coefficient calculation unit 211 next reports the assignment of the working frequency to the new user and the user number of the new user to, of coefficient management units $212_1$-$212_3$, the coefficient management unit of the frequency that has been determined by decision unit 213 to be the working frequency of the new user.

(5) Of coefficient management units $212_1$-$212_3$, the coefficient management unit of the frequency to which a new user has been added reports the user number of the new user and the working frequency to setting unit 21c.

(6) Further, of coefficient management units $212_1$-$212_3$, the coefficient management unit of the frequency to which the new user has been added updates the total value of coefficients by adding the coefficient of the added user to the original total value.

While preferred embodiments of the present invention have been described using specific terms, such description is for illustrative purposes only, and it is to be understood that changes and variations may be made without departing from the spirit or scope of the following claims.

What is claimed is:

1. A CDMA communication device for assigning any of a plurality of frequencies as a working frequency of a user, and using the assigned frequency to modulate and transmit the user data of said user, said CDMA communication device comprising:
    a spreading means for spreading and multiplexing the user data of said user;
    a plurality of radio transmission means that are each provided correspondingly to each of said plurality of frequencies for modulating with said frequencies said user data that have been supplied as output from said spreading means; and
    a control means that includes a determination means for determining the working frequency of said user based on a spreading factor of said user data in said spreading means; and a setting means for setting the spreading factor of said user data in said spreading means and performing settings of said spreading means such that said user data are supplied as output to said radio transmission means that is provided correspondingly to the frequency that has been determined by said determination means.

2. A CDMA communication device according to claim 1, wherein said determination means comprises:
    a coefficient calculation means for calculating coefficients based on the spreading factor of said user data in said spreading means;
    a plurality of coefficient management means that are each provided correspondingly to each of said plurality of frequencies for, based on the calculation results of said coefficient calculation means, managing the total values of said coefficients of users' user data to which the frequencies have already been assigned; and
    a decision means for comparing the total values of said coefficients for said plurality of frequencies that are managed by means of said plurality of coefficient management means, and for determining the working frequency of said user based on the results of comparison of the total values of said coefficients.

3. A CDMA communication device according to claim 2, wherein said decision means:
    acquires, for each of said plurality of frequencies, line quality information of downlink lines to mobile devices of users to which said frequencies have already been assigned;
    compares the acquired line quality information for said plurality of frequencies; and
    determines the working frequency of said user based on the results of comparing the total values of said coefficients and the results of comparing said line quality information.

4. A CDMA communication device according to claim 3, wherein said decision means uses the signal-to-interference rate of user data, which are transmitted to the mobile device of said user, as said line quality information of a downlink line to said mobile device of said user.

5. A CDMA communication method in a CDMA communication device for assigning any of a plurality of frequencies as a working frequency of a user and using the assigned frequency to modulate and transmit user data of said user, said method comprising:
    a first step of spreading and multiplexing the user data of said user;
    a second step of deciding the working frequency of said user based on a spreading factor of said user data in said first step; and
    a third step of modulating user data that has undergone spreading and multiplexing in said first step with the frequency, which was decided as the working frequency of said user in said second step.

6. A CDMA communication method according to claim 5, wherein said second step includes:
    a fourth step of calculating a coefficient based on the spreading factor of user data of said user in said first step;
    a fifth step of, based on the calculation results of said fourth step, calculating for each of said plurality of frequencies the total values of said coefficients of user data of users to which said each of said plurality of frequencies has already been assigned, and comparing, for said plurality of frequencies, total values of said coefficients that have been calculated; and
    a sixth step of determining the working frequency of said user based on the comparison results of said fifth step.

7. A CDMA communication method according to claim 5, wherein said second step includes:
    a fourth step of calculating coefficients based on the spreading factor of user data of said user;
    a fifth step of, based on the calculation results of said fourth step, calculating for each of said plurality of frequencies the total values of said coefficients of user data of users to which said each of said plurality of frequencies has already been assigned, and comparing, for said plurality of frequencies, total values of said coefficients that have been calculated;
    a sixth step of acquiring, for each of said plurality of frequencies, line quality information of downlink lines to mobile devices of users to which said each of said plurality of frequencies has already been assigned, and comparing the acquired line quality information for said plurality of frequencies; and a seventh step of determining the working frequency of said user based on the comparison results of said fifth step and of said sixth step.

8. A CDMA communication method according to claim 7, wherein said sixth step and said seventh step use the signal-to-interference rate of user data, which are transmitted to mobile devices of said users, as said line quality information of downlink lines to said mobile devices of said users.

* * * * *